US007641930B2

(12) United States Patent  (10) Patent No.: US 7,641,930 B2
Hanselmann  (45) Date of Patent: Jan. 5, 2010

(54) CHOCOLATE PRODUCTS AND INGREDIENTS AND METHODS FOR PRODUCING NOVEL OIL-IN-WATER SUSPENSIONS

(75) Inventor: William Hanselmann, Hershey, PA (US)

(73) Assignee: The Hershey Company, Hershey, PA (US)

( * ) Notice: Subject to any disclaimer, the term of this patent is extended or adjusted under 35 U.S.C. 154(b) by 0 days.

(21) Appl. No.: 11/006,820

(22) Filed: Dec. 8, 2004

(65) Prior Publication Data

US 2006/0121164 A1 Jun. 8, 2006

(51) Int. Cl.
*A23L 2/38* (2006.01)
*A23G 1/00* (2006.01)

(52) U.S. Cl. .................. 426/593; 426/631; 426/578; 426/579

(58) Field of Classification Search ................. 426/503, 426/631
See application file for complete search history.

(56) References Cited

U.S. PATENT DOCUMENTS

| 3,615,659 | A | * | 10/1971 | Weber .................. 426/584 |
| 4,234,611 | A | * | 11/1980 | Kahn et al. .............. 426/321 |
| 4,235,939 | A | | 11/1980 | Kimberly, Sr. et al. |
| 4,362,758 | A | | 12/1982 | McNeill et al. |
| 4,443,487 | A | | 4/1984 | Darling |
| 4,623,552 | A | * | 11/1986 | Rapp .................. 426/575 |
| 4,637,937 | A | | 1/1987 | Terada et al. |
| 5,108,769 | A | | 4/1992 | Kincs |
| 5,160,760 | A | | 11/1992 | Takemori et al. |
| 5,190,786 | A | * | 3/1993 | Anderson et al. ........... 426/631 |
| 5,425,957 | A | | 6/1995 | Gaim-Marsoner et al. |
| 5,468,509 | A | | 11/1995 | Schlup et al. |
| 5,894,031 | A | | 4/1999 | Caly et al. |
| 6,146,672 | A | | 11/2000 | Gonzalez et al. |
| 6,165,540 | A | | 12/2000 | Traitler et al. |
| 6,488,975 | B1 | * | 12/2002 | Sethi et al. ............... 426/431 |
| 6,547,602 | B2 | * | 4/2003 | Price et al. .............. 439/638 |
| 2004/0126464 | A1 | * | 7/2004 | Zimeri et al. ............ 426/103 |

FOREIGN PATENT DOCUMENTS

| DE | 1692379 | 3/1972 |
| EP | 0 135 768 A2 | 4/1985 |
| EP | 0 317 899 A2 | 5/1989 |
| EP | 0463 688 A1 | 1/1991 |
| EP | 0 566 428 A1 | 10/1993 |
| JP | 3139241 A | 6/1989 |
| JP | 1997037716 A | 2/1997 |
| JP | 2001149014 A | 6/2001 |
| WO | WO 98/01488 | 1/1998 |
| WO | WO 00/32057 | 6/1999 |
| WO | WO 0195737 | 12/2001 |

OTHER PUBLICATIONS

D'Amico, J. 1995. The Science Chef. John Wiley & Sons, Inc., New York. p. 113-117, 119.*
Anon. 1983. Hershey's 1934 Cookbook. Hershey Chocolate Company, Hershey, Pa. p. 53.*
Farmer, F. 1892. The Original Boston Cooking School Cook Book, facsimile of the first edition of The Boston Cooking School Cook Book. Weathervane Books, New York., p. 334.*
McGhee, H. 1983. On Food and Cooking. Collier Books, New York. p. 335-341.*
Teubner, C. et al. 1997. The Chocolate Bible. Penguin Studio, New York. pp. 40-41.*
Wesler, C. 2000. The Complete Cookling Light CookBook. Oxmoor House, Birmingham, Al. p. 510.*
Anishchenko B.I., et al., Against the nun moth, *Zashchita rastenii*, 1982, No. 4, p. 17f (English Abstract).
Barrile J, et al., Effect of Added Moisture on the Heat Resistance of *Salmonella anatum* in Milk Chocolate, Applied Microbiology, Jan. 1970, 177-178.
Cacace D, et al., Composition and characteristics of food emulsions, Industria Conserve, 1992, 67, 81-86 (English Abstract).
Directive 2000/36/EC of the European Parliament and council of Jun. 23, 2000 relating to cocoa.
Fruman D.H., Development of a Batchwise In-Situ Regeneration Type Separator to Remove Oil from Oil-Water Suspensions, TR-7080-3; MA-RD-930-75060, 1974, p. 117, Hydronautics, Inc.
Fryer P, et al., The Material Science of Chocolate, Materials Res. Soc'y Bull., Dec. 2000, 25-29.
Geilinger L, et al., Isolation and Characterization of Native Starch from Cocoa Bens, Starch/Staerke 33, 1981, No. 3, pp. 76-79.
Health Canada, Food and Drug Regulations, B.04.001.012., May 1997.
Hollowood, TA, et al., The Effect of Viscosity on the Perception of Flavour, Chem. Senses, 27: 583-591, 2002.
Jingkun Li, et al., Effects of ice-nucleation active bacteria on the freezing of some model food systems, Internal Journal of Food Science & Technology, 1997, 32, 41-49.

(Continued)

*Primary Examiner*—Carolyn A Paden
(74) *Attorney, Agent, or Firm*—Wiley Rein LLP

(57) ABSTRACT

The invention provides novel means and methods for manipulating cocoa and milk ingredients, for example, to produce edible oil-in-water suspensions. In one embodiment, cocoa products are used to produce a gel network formed by cocoa starches and/or proteins. The suspension is formed with milk proteins and cocoa solids and also comprises crystallized cocoa butter as a dispersed component, and water or skim milk as the continuous phase or aqueous phase. The compositions, products, and ingredients possible according to the invention provide novel methods and components for low or reduced calorie or sugar free chocolate products or ingredients having the same cocoa content as conventional chocolate and/or falling within the standard of identity for chocolate products. In addition, the production and packaging options for chocolate products are expanded by the use of the invention as the viscosity of the chocolate product or ingredient can be varied easily without specific reliance on cocoa butter content.

66 Claims, 5 Drawing Sheets

OTHER PUBLICATIONS

Jiugao Y, et al., Effects of suspension crosslinking reacting conditions on the sizes of starch microspheres, Starch/Starke, 1994, 46, 252-255.

Krushev L.T., et al., Addition of an exotoxin to increase the effectiveness of bacterial preparations, Lesnoe Khozyaistvo, 1972, 8, 59-61 (English Abstract).

Meursing E.H., Cocoa powders for industrial processing, 1983, Knijnenberg B.V., Holland.

Pongsawatmanit, R. et al., Effect of Sucrose on RVA Viscosity Parameters, Water Activity and Freezable Water Fraction of Cassava Starch Suspensions, ScienceAsia, 28 (2002): 129-134.

Schmeider R.L., et al. Characterization and Quantification of Starch in Cocoa Beans and Chocolate Products, Journal of Food Science, 1980, 45, 555-557.

Simmons I.D., et al., Processing of dried sultanas—the effect of tempature and machine settings, Confructa, 1979, 24, 28-37.

U.S. Food and Drug Administration, 21 Code of Federal Regulations, Apr. 2, 2002, 163.123 and 163.130.

Voight J., et al., The major seed proteins of *Theobroma cacao* L., Food Chemistry, 1993, 47, 145-151.

Zak D.L., et al., Extraction and fractionation of cocoa proteins as applied to several varieties of cocoa beans, J. Aggric. Food Chem., 1976, 24, No. 3, 479-483.

Zak D.L., et al., Changes in cocoa proteins during ripening of fruit, fermentation, and further processing of cocoa beans, J. Agric. Food Chem., 1976, 24, No. 3, 483-48.

Zumbe A, et al., Polyols in confectionary: the route to sugar-free, reduced sugar and reduced calorie confectionary, British Journal of Nutrition, (2001), 85, Suppl. 1, S31-S45.

VanNOSTRAND's Scientific Encylopedia, 4th Ed., 1968 (Emulsion and Suspension).

Beckett, S.T., Industrial Chocolate Manufacture and Use, 3rd Ed., pp. 154, 380.

Servais, C, et al., The Influence of Particle Size Distribution on the Processing of Food, Journal of Food Engineering, vol. 51, Issue 3, Feb. 2002, pp. 201-208 (Abstract).

Petursson S, et al., Stabilization of oil-in-water emulsions by cod protein extracts, J Agric Food Chem., Jun. 16, 2004: 52 (12): 3996-4001 (Abstract).

Paquin P. Technological properties of high pressure homogenizers; the effect of fat globules, milk proteins, and polysaccharides, International Dairy Journal, vol. 9, Issues 306, Mar. 1999, pp. 329-335 (Abstract).

Kiokas S, et al., Stability of whey-protein-stabilized oil-in-water emulsions during chilled storage and temperature cycling, J Agric Food Chem., Jun. 16, 2004; 52(12): 3823-3830 (Abstract).

Coupland J, et al., Droplet size determination in food emulsions: comparison of ultrasonic and light scattering methods, Journal of Food Engineering, vol. 50, Issue 2, Nov. 2001, pp. 117-120 (Abstract).

Akar, et al, Polymer Science and Technology, Chapter 4, Suspension Polymerization, pp. 16-17.

Roelofs P, et al., Reduction of dust concentration in pig facilities by regular spraying of an oil emulsion, 2001, CAB Accession No. 20013119015.

Fuji Sunny Foods Corp.PTE Ltd., "Center Chocolate" description, www.sfs.com.sg (2005).

* cited by examiner

CHOCOLATE PRODUCTS AND INGREDIENTS AND METHODS FOR PRODUCING NOVEL OIL-IN-WATER SUSPENSIONS

FIELD OF THE INVENTION AND INTRODUCTION

The invention relates to novel methods for manipulating protein and polysaccharide/starch components of food products or ingredients, and in particular cocoa-containing products, as a food ingredient and as a final food product. In one aspect, the invention encompasses a chocolate composition comprising a gel network formed by cocoa starches and/or proteins, or milk proteins and cocoa solids, and also comprising crystallized cocoa butter as a dispersed component, and water or milk or skim milk as the continuous phase or aqueous phase of a suspension. Previously, chocolate compositions employed cocoa butter as the continuous phase in compositions and suspensions, generally with sugar, milk solids and cocoa solids as the dispersed phase. Both liquid cocoa compositions and solid compositions traditionally follow this standard. The compositions, products, and ingredients possible according to the invention, however, can utilize the gel forming potential of starch and protein components of cocoa ingredients and/or other ingredients to create a wide range of oil-in-water suspensions with advantageous properties. For example, recipes for a low or reduced calorie chocolate product or ingredient having the same cocoa content as conventional chocolate and/or falling within the standard of identity for chocolate products can be designed. In addition, the production and packaging options for chocolate products are expanded by the use of the invention as the viscosity of the chocolate product or ingredient can be varied easily without specific reliance on cocoa butter content.

DESCRIPTION OF RELATED ART

Chocolate products and ingredients conventionally exist as suspensions, with fat or oil as the continuous phase. Polymorphic crystals of cocoa butter form an important part of the fine structure of these suspensions and the methods to control crystallization of cocoa butter are well known. In general, the setting of cocoa butter crystals into the most stable form is desirable. The failure to account for the difference in forms within the fat suspension can result in poor color and blooming.

From a production point of view, cocoa butter content has been changed to vary the viscosity of chocolate compositions, so that higher cocoa butter content results in a more viscous final product or ingredient. While heating may be used to increase flowability or solubility of certain ingredients in chocolate processing or packaging, heating is not used as a method to change the properties of cocoa-containing compositions.

SUMMARY OF THE INVENTION

The present invention relates to a food product or ingredient having a crystallized and gelatinized structure in an oil-in-water suspension. The combination of a gelatinized structure, a crystallized structure, and an oil-in-water suspension made possible and demonstrated by the methods, food products and ingredients of the invention provide numerous advantages in the food processing field. For example, the invention provides products with improved viscosity characteristics over a greater range of temperatures and allows sugar free or low or reduced calorie products to be produced while maintaining other desirable characteristics, such as texture, taste, mouthfeel, and viscosity. Furthermore, the invention can be said to incorporate methods and ingredients, or more particularly moisture levels, that standard practices report as inappropriate or undesirable in the chocolate manufacturing field. For example, Beckett (Industrial Chocolate Manufacture and Use, 3d Ed., Beckett ed., 1999 Blackwell Science Ltd., see Chaps. 9 and 20 in particular) notes that it is necessary to remove moisture during processing of chocolate to avoid the requirement to use additional fat and to avoid or minimize the possibility of microbial growth. In addition, Minifie (Chocolate, Cocoa, and Confectionery, 3d Ed., 1999, Aspen Publishing, see Chap. 5 in particular) notes the importance of minimizing the introduction of water in chocolate processing in order to maintain a desired viscosity. Thus, in one aspect, by using water or water-based solutions as the aqueous phase in an oil-in-water solution for cocoa and/or chocolate food ingredients or products, the invention utilizes counter-intuitive methods and ingredients as compared to typical chocolate product and ingredient manufacturing.

In one embodiment, the food ingredient comprises an oil or fat phase comprising at least about 2% or at least about 3% cocoa solids and at least about 2% or at least about 3% cocoa butter, the cocoa solids being in suspension and/or at least partially crystallized in the final ingredient or product at room temperature. In various embodiments involving cocoa or chocolate, the cocoa butter and cocoa solids content from one or more of a variety of added cocoa-containing products can be selected to generate a range of final weight percent values, including from about 2% to about 3% cocoa butter, about 3% to about 5% cocoa butter, about 5% to 10% or higher cocoa butter, and about 2% to about 3% cocoa solids, about 3% to about 5% cocoa solids, and about 5% to 10% or higher cocoa solids, and any combination of these ranges. In one aspect, the invention does not encompass prior or conventional chocolate milk mixtures that do not possess or are not treated to generate a gelatinized and/or oil-in-water suspension as described here. Generally, prior chocolate milk mixtures do not form stable suspensions, as one of skill in the art understands.

The food ingredients or products of the invention or used in the invention are not limited to any particular state or temperature, for example room temperature. The reference to crystallized or partially crystallized structures at room temperature means the food ingredient or product is capable of exhibiting a crystallized or partially crystallized structure or microstructure when at room temperature. Thus, in part, the suspension has a crystallized structure. The food ingredient further comprises an aqueous phase comprising water or milk or skim milk, such as a composition of at least about 5% milk solids and at least about 5% nutritive carbohydrate sweetener. The soluble starches or polysaccharides and protein present in at least the cocoa solids, or other cocoa product, are capable of forming a gel network in the suspension. Thus, in part, the suspension has a gelatinized structure. The insoluble particles from at least the cocoa, such as the cocoa cell wall materials, are dispersed within the gel network forming part of the suspension. While cocoa-containing compositions are routinely referred to, the invention is not limited to cocoa-containing compositions. Other food ingredients or edible compositions can be used.

In a specific embodiment, the food ingredient of the invention has at least about 15%, or at least about 18%, or at least about 20% cocoa solids by weight in its final ingredient form or product form. Thus, the methods and ingredients and products of the invention can be used in the production of various chocolate products that fall within the standard of identity for chocolate, milk chocolate, bittersweet chocolate, and white chocolate that may exist in a desired market or under a particular regulatory setting. Furthermore, artificial or non-nutritive sweeteners can be used in conjunction with the invention to produce low calorie or low carbohydrate products or sugar free products. Also, vitamin and/or mineral food additives can be optionally added to improve the nutritional content of chocolate or cocoa-containing foods, for example.

In another aspect, the invention comprises a method of making a food ingredient where a fat or oil phase composition comprising cocoa butter, milk fat and/or other edible fat, and optionally an emulsifier, is mixed with an aqueous or continuous phase comprising water or milk. The mixing can be performed by a variety of methods known to the food and food ingredient industries, and specifically includes homogenizer, dynamic mixer, or static mixer processes. After preparing the oil-in-water suspension, the mixture of the oil or fat phase with the aqueous or continuous phase can be heated under conditions where the protein and starch components of the cocoa solids produce a gel network. In general terms, the gel network is functionally a gelatinized composition having an increased viscosity compared to its pre-treatment or pre-heated form. It can be prepared from biopolymer-containing components, such as protein and/or carbohydrate containing components, particularly cocoa products such as cocoa solids and milk products such as milk solids. One of skill in the art is familiar with methods and equipment for measuring the viscosity of compositions, including the compositions noted here. Without limiting the invention to any particular mechanism, the protein and/or soluble carbohydrate or starch components in a composition of food ingredients, such as a cocoa-containing composition, can be effectively swelled or water-saturated by particular treatments or heating processes depending on the components of the composition. In preferred treatments, the gel network formation occurs efficiently by heating to a range between about 52° C. to about 68° C. for cocoa-containing compositions. Gel network formation in the same cocoa-containing compositions can also occur through prolonged standing, with or without mechanical shearing. Functionally, the treating or heating step should disrupt the native protein conformation and/or swell carbohydrate or starch or biopolymer components from their existing state in order to form a gel network. Since the swelling of cocoa product components can take long periods of time and/or employ mechanical treatments, the preferred method of preparing a gel network according to this invention is by heating.

In the photomicrographs of FIGS. 5 and 6, one can see the difference between the treated or heated cocoa components and the same components after conventional cocoa processing. In general, the methods of the invention allow for a microstructure of cocoa-containing compositions or suspensions where the cocoa butter droplets can be from about 0.5 to about 100 microns in diameter, or more preferably about 0.5 to about 30 microns in diameter. Furthermore, the carbohydrate or starch components of the cocoa products used or the cell components from the cocoa products used are visibly swelled in the methods and products of the invention (see FIG. 6), while in the conventional dark chocolate composition of FIG. 5, by comparison, they are typically present as crystallized and/or amorphous components in the suspension. In addition, the sugar in the suspension of FIG. 6 is dissolved in the continuous phase rather than in crystalline structures as shown in the conventional composition of FIG. 5, thus leading to a more uniform and smoother texture.

In another aspect, the invention provides a novel oil-in-water suspension at temperatures below the melting point of the cocoa butter in a cocoa butter containing composition. In this and other aspects of the invention, cocoa butter is discussed as part of the fat or oil phase. However, other cocoa containing products can be used, such as cocoa liquor or cocoa powder. In addition, one of ordinary skill in the art is familiar with adding emulsifiers and/or hydrocolloids and/or other biopolymers to cocoa products, and emulsifiers and hydrocolloids and protein and starch compositions can optionally be added or replaced by cocoa butter in the food ingredients, products and compositions of the invention. Beyond cocoa butter or other cocoa products, additional fat components can be added in the methods to produce the food ingredients or products of the invention, especially including those with a melting point above room temperature or at or above about 25° C. or at or above about 35° C. As shown below, fractionated and/or hydrogenated and/or interesterified palm kernel oil, palm oil, coconut oil, cottonseed oil, sunflower oil, canola oil, and corn oil, or cocoa butter substitute, for example, can be used as an edible oil with a melting point above room temperature.

In particular aspects, the invention includes processing a food ingredient into a processed product or composition. The processed products or compositions can be prepared by any method of the food and confectionary industry. For example, in-process steps can include adding components, such as adding vitamins, minerals, food grade gas, and one or more of the variety of ingredients available. Processing can also or in addition involve producing a marketable food product by coating, forming, molding, extruding, enrobing, injecting, baking, freezing, packaging, layering, rolling, cutting, depositing, panning, casting, or any other available method (see, for example, Minifie, "Chocolate, Cocoa, and Confectionery," 3d ed., Aspen Publishers). Additionally, filtration or separation processes can be included to, for example, remove substantially all insoluble particles from an ingredient or food product.

As noted above, the preferred process for forming a gel network is heating. For the cocoa product containing compositions, heating the mixed oil and aqueous phases can comprise heating to about 121° C. for about 8.5 minutes, or to about 150° C. for at least about 4 seconds, or simply heating to about 68° C. for a period of time sufficient to form a gel network. In general, for cocoa containing products, cocoa starch can be formed into a gel network if it is subjected to a temperature of about 52° C. to about 68° C., so any heating process that results in the cocoa starch reaching this temperature should suffice. Other, lower temperatures can also be selected and used if longer periods of time are employed. The higher temperatures noted here can be used in optional processing methods or optional sterilizing methods. Other methods include allowing the mixture to rest at room temperature for a period of time sufficient to form a gel network, or using high shear conditions, for example with a high pressure homogenizer.

In some of the many possible food products that can be produced, the food ingredient of the invention can be further processed into a product containing milk chocolate, sweet chocolate, bittersweet chocolate, semisweet chocolate, or white chocolate. In addition, the product can comprise one or more of chocolate liquor, cocoa powder, heavy cream, anhydrous milk fat, whey protein concentrates, non-fat milk protein, whole milk powder, sugar, lecithin, vanillin, and skim milk, as shown in the examples below.

In a more general aspect, the invention involves preparing an oil-in-water suspension using one or more cocoa containing products. The cocoa containing products are those processed from, or some degree of processed form of, the cacao bean that are commonly available. As noted above, certain microstructure environments can be created using the protein and starch components from the cacao bean products. While the production of oil-in-water emulsions in chemical processes is not new, the use of oil-in-water suspensions for cocoa containing products in particular, and food products more generally, is not common. In addition, the use of oil-in-water suspensions for chocolate products falling under one or more of the many standards or identity for these products has not been described previously. In another general aspect, the invention comprises preparing an edible gelatinized and crystallized microstructure within an oil-in-water suspension by using a gel network forming biopolymer containing product, such as a cocoa product, a fruit product, a berry product, or a vegetable product. A gel network-forming amount of a biopolymer is used and the suspension comprises an aqueous phase and a dispersed oil or fat phase, wherein the gel network is capable of being formed from the biopolymer after heating the suspension, and the components of the oil or fat phase are at least partially crystallized at room temperature and stably present in the suspension. By the phrase "stably present in suspension," the components of the suspension remain substantially in suspension for a period of up to 3 months, or up to 6 months, or up to 8 months, or up to 12 months, or up to 18 months, or up to 24 months or longer. The microstructures of the dispersed phase can be selected to have a size of about 100 um or less in diameter while in the suspension. The food ingredient made from these suspensions can have a biopolymer originally provided in the form of a cocoa containing product, a fruit containing product, a berry containing product, or other similar product, or even a hydrocolloid containing product. This food ingredient can also or alternatively comprise a component in the oil or fat phase that is at least partially crystallized at room temperature and can be selected from one of more of cocoa butter, fractionated and/or hydrogenated and/or interesterified palm kernel oil, palm oil, coconut oil, cottonseed oil, sunflower oil, canola oil, and corn oil, 17-sterine, cocoa butter substitutes or equivalents, milk fat, or any oil or fat that is at least partially solid or crystallized at room temperature, or about 20° C., or about 25° C., or about 30° C. In addition, the invention specifically includes a final food product that comprises any of the food ingredients noted or any food ingredient produced by a method noted throughout this disclosure.

As discussed here, the oil-in-water suspension refers to a suspension of, for example, oil droplets and/or insoluble particles in a continuous medium or phase, whereas in an emulsion, by contrast, all components are dissolved in the continuous phase. In general for the food rheology field, a suspension is at least one solid dispersed within a continuous phase, where the continuous phase is at least one liquid (see, for example, Van Nostrand's Scientific Encyclopedia, D. Van Nostrand Co., Inc., Princeton, N.J., $4^{th}$ ed. 1968, pp. 620 and 1782; Rheologie der Lebensmittel, Weipert/Tscheuschner/Windhab, Behr's Verlag, Hamburg, Germany, 1993, pp. 108 and 122). The edible oil-in-water suspension of this invention refers to a dispersed phase of oil droplets and insoluble particles that are suspended in a substantially stably manner within an aqueous continuous phase, whereas in an emulsion all of the dispersed phase components must be liquid and are merely mixed in the continuous phase and are not, generally, stably suspended. Furthermore, emulsions do not necessarily employ the gel network as mentioned here. In fact, there are no reports of cocoa-based gel networks used to produce edible oil-in-water suspensions as described here. Thus, in general, the suspensions of the inventions comprise a dispersion of crystalline and/or non-soluble droplets and/or particles dispersed in a gel network or gelatinized continuous aqueous phase. While cocoa-based oil-in-water suspensions are noted as a preferred embodiment, other biopolymer-containing compositions can be used also.

In one aspect of a method of producing a cocoa-based oil-in-water suspension, the method involves mixing a fat phase comprising one or more cocoa products, including cocoa butter, and having cocoa protein and/or starch or carbohydrate components, with an aqueous phase. In preferred embodiments, the final non-fat cocoa solids content is at least about 2% or about 3% or about 4% or more by weight of the final suspension. Also in preferred embodiments, the aqueous phase comprises water, a sugar or sweetener or both, and/or milk and/or skim milk and/or cream. Other liquids or solutions can also be used as the aqueous phase and the invention specifically includes chocolate or cocoa compositions prepared without milk or milk products, even chocolate or cocoa beverages without milk. Once mixed, a swelling or heating step occurs to form a gel network comprised of cocoa proteins and cocoa starch components. The formation of a gel network can be detected by a variety of methods known in the art, including microscopy, direct viscosity measurements, ultrasonic methods, and light scattering methods. If a viscosity measurement is used, one preferred detectable change is where the viscosity of the suspension increases after heating when measured as shear rate. More particularly, the viscosity increase is at least about two-fold or double in the measurable 30 sec-1 shear rate. If microscopy is used, one of skill in the art can measure gel formation by the effects on the final suspension and the appearance of component parts within the suspension. For example, starch granules in cocoa-containing compositions can be visualized prior to swelling and after gelatinization, and cocoa butter droplets can be visualized in the suspension at about room temperature in the range of between 0.5-100 um, or between 0.5-30 um.

Throughout this disclosure, applicants refer to journal articles, patent documents, published references, web pages, and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples that follow are merely exemplary of the scope of this invention and content of this disclosure and do not limit the scope of the invention. In fact, one skilled in the art can devise and construct numerous modifications to the examples listed below without departing from the scope of this invention.

to a composition prepared according to the invention (▲). The viscosity is much higher for the compositions of the invention.

Figure 3:
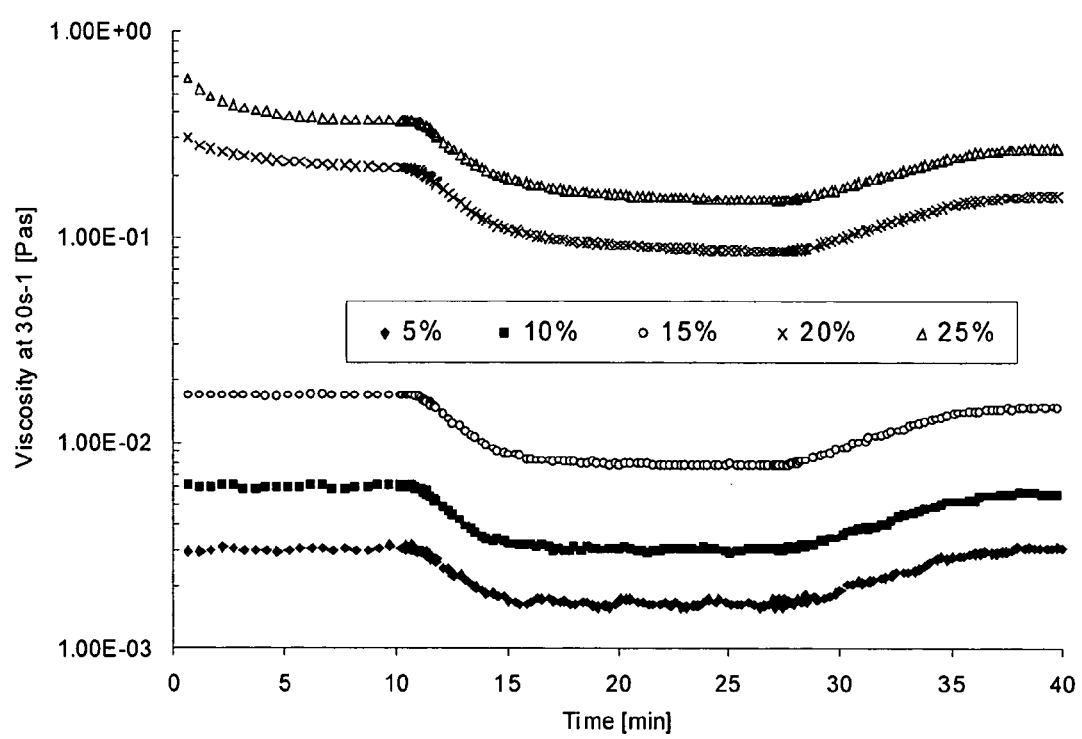

FIG. 3 shows the viscosity characteristics of cocoa butter and skim milk compositions at various (5%, 10%, 15%, 20%, and 25%) concentrations of cocoa butter and over a temperature change. At these temperatures and these periods of time, the change in viscosity represents a change in the crystallization state of cocoa butter droplets in the compositions. From 0-10 minutes, each composition was kept at 20° C.; at 10 minutes each composition was heated until it reached 45° C. at 15 minutes, where the temperature is maintained for 12 minutes. After the heating period, the compositions are allowed to return to 20° C. Viscosity measurements over the changing temperature reflect the melting of oil in the cocoa butter droplets. As is the case in conventional cocoa and chocolate containing compositions, the higher the cocoa butter content the higher the viscosity. Here and throughout unless otherwise stated, a TA Instruments AR2000 concentric cylinder is used, DIN 53 019, and a shear rate of 30/sec.

Figure 4:
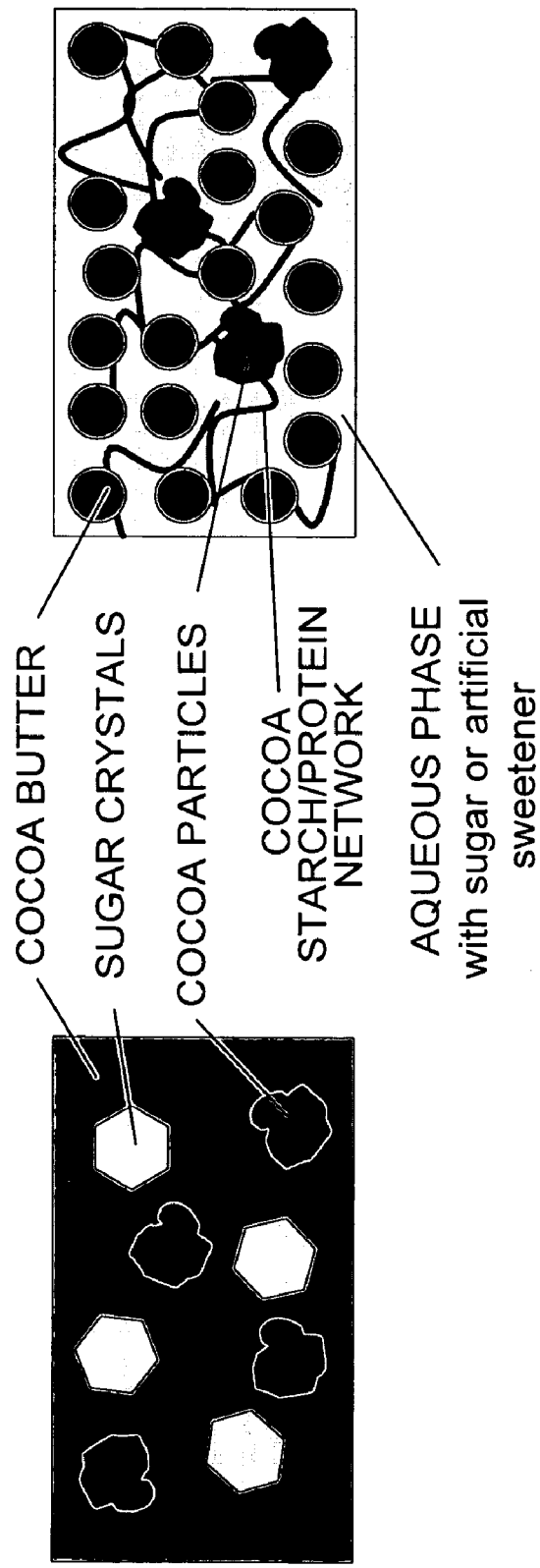

FIG. 4 schematically represents the differences between a conventional composition ("Crystallized Suspension") and the compositions of the invention ("Crystallized/Gelatinized O/W Suspension"). In the conventional composition, cocoa butter is the continuous phase in the suspension. The level of cocoa butter, the solubility of components in cocoa butter, and the physical properties of the suspension, among other things, necessarily limit the characteristics and additives available if one desires to produce a chocolate product or ingredient falling within the standard of identity for chocolate in many countries of the world. In general, hydrophilic molecules are not soluble in oil, or an oil phase like cocoa butter. Consequently, the microstructure of such an oil and hydrophilic combination is referred to as a suspension. However, one fat or oil can be dissolved within another fat or oil, sometimes with an added emulsifier. In contrast, the oil-in-water suspension of the invention contains a continuous phase that can actually be an aqueous phase and the additives and variety and proportion of components is increased and is not limited to fats or oils.

Figure 5:
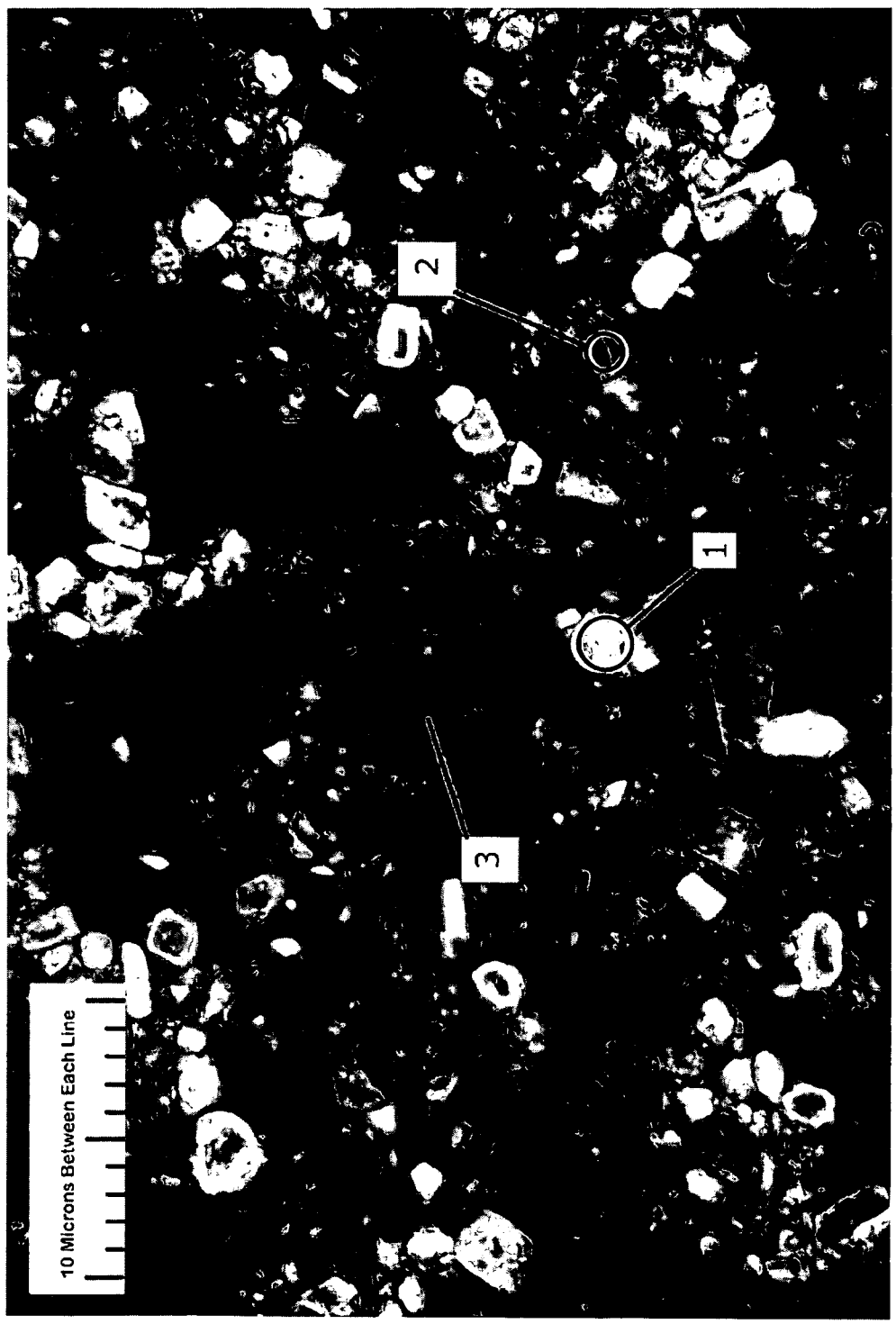

FIG. 5 is a photomicrograph showing a diluted conventional chocolate composition. Sugar crystals are indicated at (1). Cell wall particles from the cocoa are indicated at (2). The continuous phase is labeled (3).

Figure 6:
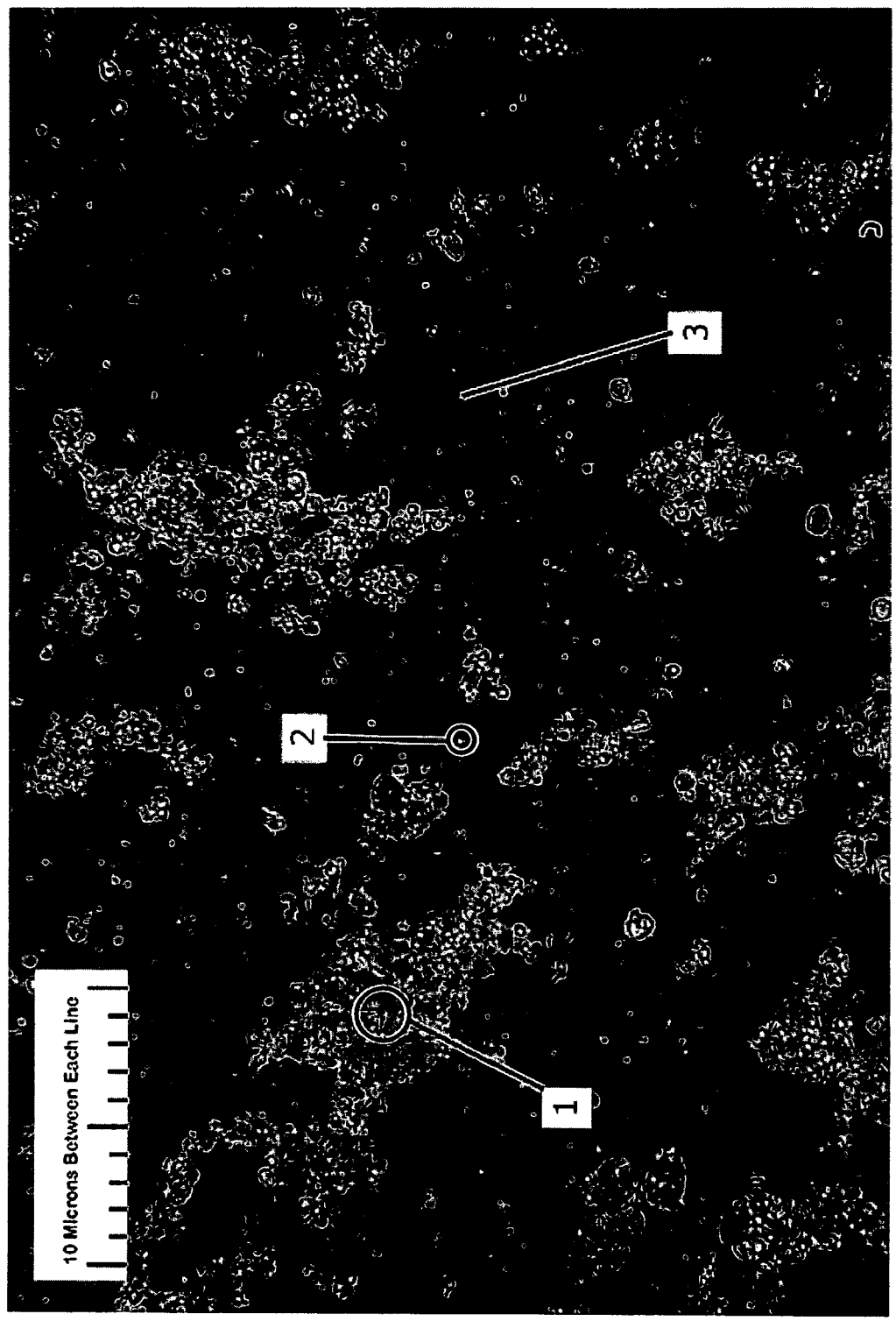

FIG. 6 is a photomicrograph of a diluted cocoa composition of the invention or one prepared according to the methods of the invention. The aqueous phase or continuous phase of the suspension is marked at (3). Number (1) points to a fragment or element of the gel network formed by starch and/or protein components, here from cocoa, and can include the cell wall components of cocoa. Crystallized cocoa butter droplets are present in the suspension and the refraction from droplets can be seen as lipid or fat droplets, as pointed out in (2).

DETAILED DESCRIPTION OF EXEMPLARY EMBODIMENTS

Throughout this disclosure, applicants refer to texts and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources. The description and examples that follow are merely exemplary of the scope of this invention and content of this disclosure and do not limit the scope of the invention. In fact, one skilled in the art can devise and construct numerous modifications to the examples listed below without departing from the scope of this invention. In general and as used in this invention, the various chocolate and cocoa-containing products and compositions noted here refer to the terms as used in Minifie (Chocolate, Cocoa, and Confectionery, 3d ed., Aspen Publishers), specifically incorporated herein by reference. The cacao bean refers to the cacao bean, also called cocoa bean, in nature and a cocoa containing product is a product derived from or having some component derived from the cocoa bean. The nib refers to the cacao bean without the shell and is approximately 54% fat and 46% non fat solids on a dry basis. Non fat cocoa solids are the processed non fat solids of chocolate liquor. Cocoa powder refers typically to cocoa solids with a total of 10% to 12% fat, where the fat is generally cocoa butter. Breakfast cocoa is cocoa solids with 20 to 24% fat, where the fat is generally cocoa butter. Chocolate liquor (or cocoa liquor) is ground cocoa nibs and it can be separated into cocoa butter and cocoa solids. Cocoa butter is the fat component of chocolate liquor, whereas the remaining part of chocolate liquor is cocoa solids or the cocoa mass. As one of skill in the art understands, a certain amount or percentage of cocoa solids in a food ingredient can be achieved, inter alia, by using or adding an amount of cocoa powder, chocolate liquor, or other chocolate or cocoa ingredient containing the requisite amount of cocoa solids. Similarly, a certain amount or percentage of cocoa butter in a food ingredient can be achieved, inter alia, by using or adding an amount of chocolate liquor or other chocolate or cocoa ingredient containing the requisite amount of cocoa butter. Furthermore, while many different countries specifically define food products containing cocoa or cocoa products as having certain ranges or ingredients, the terms chocolate, milk chocolate, and dark chocolate, are as used commonly in the US food industry and do not imply, unless stated otherwise, a specific content. In addition, while a cocoa containing product having a particular anti-oxidant or polyphenol level is not required, the invention encompasses the use of cocoa containing products with enhanced, altered, or increased levels of anti-oxidants or polyphenol compounds as compared to conventional cocoa containing products. Other nutritional, therapeutic, or preventative ingredients can be added as well, as known in the art.

As noted above, in one general aspect, the invention provides a method for producing a gel network or gelatinized structure with a cocoa-containing product. The following table depicts the results of using a heating a process with cocoa powder in water to generate a gelatinized suspension.

TABLE 1

Viscosity values of various cocoa powder in water compositions before and after heating to 90° C.

| Cocoa Powder [90% non-fat cocoa solids 10% cocoa butter] wt/wt | Initial viscosity [mPas at 30 sec$^{-1}$] | Peak viscosity | Final viscosity |
| --- | --- | --- | --- |
| 5% | 2 | 0.5 | 3 |
| 10% | 4.5 | 4 | 8 |
| 15% | 11 | 130 | 70 |
| 20% | 30 | 750 | 350 |
| 25% | 300 | 3300 | 1500 |
| 30% | 1500 | 8200 | 2500 |

Figure 1:
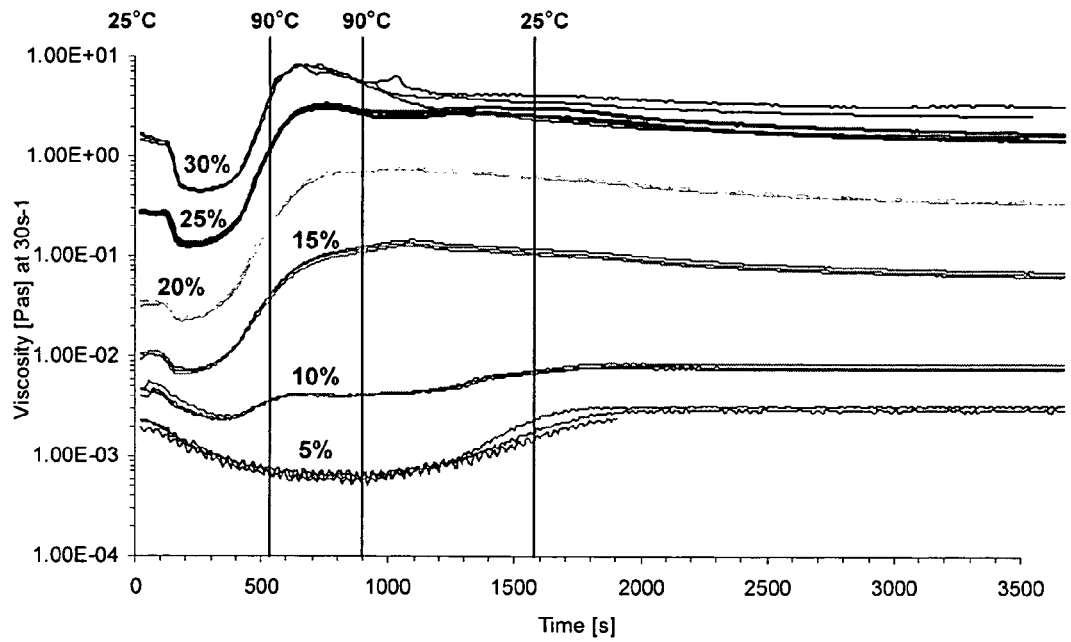
FIG. 1 depicts a graph of the viscosity of a various cocoa compositions during a heating process over time. The levels of cocoa powder in water used in each composition are indicated next to each curve (5%, 10%, 15%, 20%, 25%, and 30%). The heating temperature is indicated at the top. The results show the impact of heating on the formation of a higher viscosity gel network from the components of the cocoa powder. In each case, some change or increase in viscosity can be seen during heating. However, marked increases in viscosity are apparent at 15% cocoa powder and above.
Figure 2:
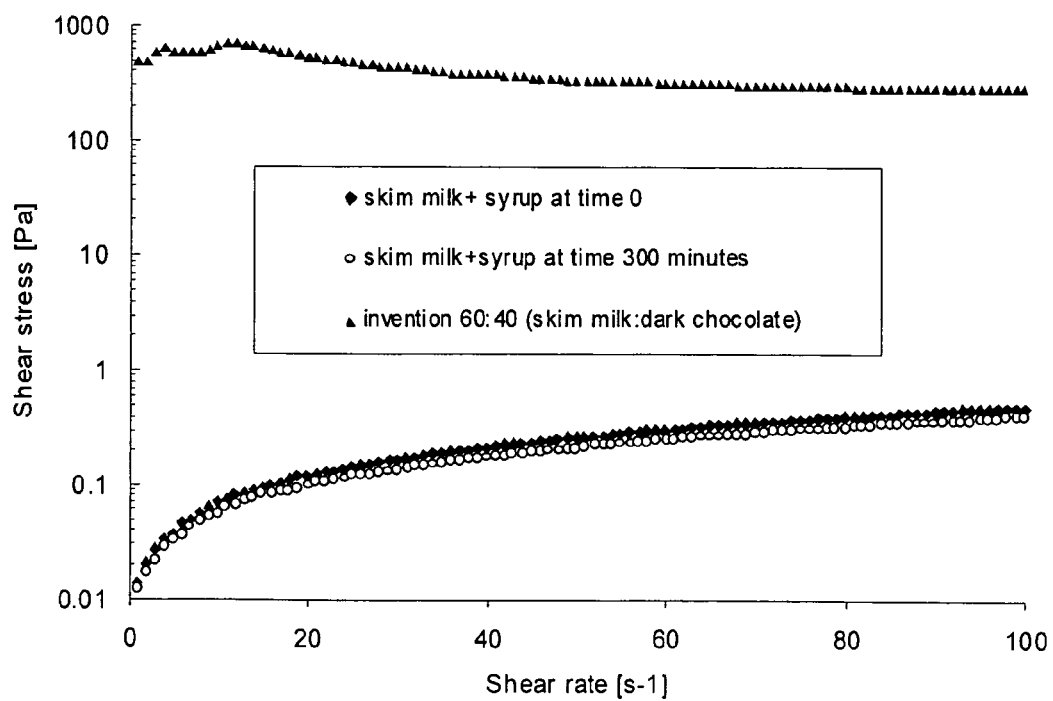
FIG. 2 shows a comparison of conventional chocolate drinks ("o" skim milk+chocolate syrup and "♦" after 5 hours)

The results shown in Table 1 and FIG. 1 compare various cocoa powder in water combinations and the production of a functional gel network, as determined by measuring viscosity. The cocoa powder and water is first mixed in a rotor stator mixer for about 5 sec to about 1 min or 2 min. A homogenizer or high pressure homogenizer can be used, which produces a minimum droplet size almost instantaneously. Then the compositions of cocoa powder in water are heat treated to produce a gel network. More specifically, cocoa powder is dissolved in water and a 12.2 ml sample poured into a concentric cylinder DIN 53 019 TA Instruments AR2000 Rheometer. A temperature sweep is performed from 25° C. to 90° C. at 10° C./min, holding at 8 minutes at 90° C., cooling from 90° C. to 25° C. at 10° C./min, and holding at 25° C. for 40 minutes. A shear rate of 30/sec is used. At concentrations of about 5%, there is little effect on the viscosity, although it is increased compared to the pre-heating composition. Beginning at 10% cocoa powder, the viscosity increase is about two-fold or more. Even at the low level of 8 mPas, it is possible to affect the viscosity of cocoa-containing products and ingredients. As one of skill in the art is aware, the ability to monitor changes in viscosity and the microstructure of compositions have a number of processing advantages, including stabilization. Above 15%, there is a significant increase in measurable viscosity. The protein and starch components in cocoa products have been discussed in the past (see, for example, Voigt et al., Food Chemistry 47: 145-151 (1993); Schmieder and Keeney, J. Food Sci. 45: 555 (1981); Gellinger et al., Starch/Starke 33: 76-79 (1981)). However, none of these reports mentions the advantages of using the gelatinization of cocoa components to produce food products and ingredients as oil-in-water suspensions, or to produce stable suspensions with cocoa. In fact, the stable suspensions of this invention can be used to prepare cocoa or chocolate products that are stable for months, or from between about 3 months to about 2 years. Equivalent products using the prior methods, such as for example a chocolate drink or beverage, do not remain stable suspensions and must be mixed or shaken. Furthermore, the products and ingredients of the invention can be designed to provide superior characteristics through a broader range of temperatures, such as freezing temperatures, freezing and thawing conditions, and long term room temperature storage, for example. Food emulsions used today do not have these characteristics.

Using this basic principle and of the ability of cocoa containing compositions to produce a gel network, examples using a variety of other cocoa containing products can be used. In addition, other ingredients commonly used in chocolate products or defined by the standard of identity for certain chocolate products can be used. For example, chocolate liquor (cocoa and cocoa butter), cocoa butter, milk, concentrated milk, evaporated milk, sweetened condensed milk, dried milk, skim milk, concentrated skim milk, evaporated skim milk or sweetened condensed skim milk, cocoa powder, heavy cream, flavors, whey protein, anhydrous milk fat, non fat milk protein, whole milk powder, soy milk, soy milk proteins, lecithin, sugar and different corn syrups can be used. In general, moisture levels or water levels are not generally mentioned in the chocolate product standard of identity. Therefore, the invention can be used to manipulate a variety of ingredients, and substitute a variety of ingredients, for those previously used in chocolate products. While cocoa containing gel networks are described in details in these examples, the invention is not limited to cocoa-based gel networks and suspensions involving cocoa products. Other biopolymer compositions, such as those containing proteins, hydrocolloids, polysaccharides, and the like can be used to produce a gel network and combined with at least one fat component having a melting point higher than room temperature, or higher than about 20° C., or higher than about 20-25° C. In addition, other ingredients, such as fruit products, nuts, nut products, and other larger particle additives can be used in the gelatinized/crystallized suspensions of the invention, such as in certain fruit pudding compositions. In fact, any compatible group or set of ingredients can be selected as long as the components do not substantially inhibit the formation of or substantially destroy or substantially reduce the gel network forming properties of the biopolymer components selected.

EXAMPLES

Using the typical ingredients and substitutions available to the food and confectionery artisan, one can combine the cocoa products, such as cocoa powder above, in a solution to generate a gel network. As an example, in the Examples 1-3 below, the ingredients can be prepared first as fat or oil phase ingredients (for example cocoa butter containing product, such as chocolate liquor) and water or aqueous ingredients (for example milk or skim milk). In addition, typical ingredients for one or more of the chocolate products or food ingredients of the invention include one or more of soy lecithin or lecithin, cream, milk fat, butter, concentrated milk, evaporated milk, concentrated skim milk, evaporated skim milk, concentrated buttermilk, dried buttermilk, malted milk, dried milk, sweeteners, and vegetable fat. After the fat or oil phase ingredients are mixed or homogenized, the two groups of ingredients are mixed and heated to a desired temperature, for example 65° C., or about 52° C. to about 68° C. for inducing a gel network with cocoa-based components, or about 120° C. for 15 minutes for sterilization in addition to gel network formation. One of skill in the art is familiar with ultra high temperature or ultra high temperature and pressure sterilization processes that can be selected or adapted for use. Alternatively, swelling in solution can occur after longer periods of time.

Specific examples can be selected using the standards of identity for various countries, including:

U.S. Standard of Identity for Chocolate Products: for semisweet or bittersweet chocolate 35% or more chocolate liquor and less than 12% total milk solids; for milk chocolate 10% or more chocolate liquor, 3.39% or more milk fat, and 12% or more total milk solids; and for white chocolate 3.5% or more milk fat, 14% or more total milk solids, 20% or more cocoa butter, and 55% or less nutritive carbohydrate sweetener.

The CODEX chocolate standards: for chocolate 35% or more total cocoa solids, 18% or more cocoa butter, and 14% or more fat-free cocoa solids; for sweet chocolate 30% or more total cocoa solids, 18% or more cocoa butter, and 12% or more fat-free cocoa solids; for milk chocolate 25% or more total cocoa solids, 2.5% or more fat-free cocoa solids, between 12% and 14% milk solids, and between 2.5% and 3.5% milk fat; for white chocolate 20% or more cocoa butter, 14% or more milk solids, and between 2.5% and 3.5% milk fat.

The Brazilian standard of identity: chocolate (milk and dark) 25% or more total cocoa solids; for white chocolate 20% or more total cocoa butter solids.

The European standard Relating to Cocoa and Chocolate Products: chocolate 35% or more total cocoa solids, 18% or more cocoa butter, and 14% or more fat-free cocoa solids; for milk chocolate 25% or more total cocoa solids, 2.5% or more fat-free cocoa solids, 14% or more milk solids, 3.5% or more milk fat, and 25% or more total fat (cocoa butter, cocoa butter equivalents (CBE), and milk fat); for white chocolate 20% or more cocoa butter, 14% or more milk solids, 3.5% or more milk fat.

The Canadian standard for Cocoa and Chocolate Products: for bittersweet or semisweet chocolate 35% or more total cocoa solids (from liquor, cocoa butter or cocoa powder), 18% or more cocoa butter, 14% or more fat-free cocoa solids, and 5% or less milk solids; for milk chocolate 25% or more total cocoa solids (from liquor, cocoa butter or cocoa powder), 15% or more cocoa butter, 2.5% or more fat-free cocoa solids, 12% or more total milk solids, 3.39% or more milk fat; for white chocolate 20% or more cocoa butter, 14% or more milk solids, 3.5% or more milk fat.

The Mexican standard of identity: for chocolate 35% or more total cocoa solids, 18% or more cocoa butter, 14% or more nonfat cocoa solids; for bitter chocolate 40% or more total cocoa solids, 22% or more cocoa butter, 18% or more nonfat cocoa solids; semibitter chocolate 30% or more total cocoa solids, 15.6% or more cocoa butter, 14% or more nonfat cocoa solids; milk chocolate 25% or more total cocoa solids, 20% or more cocoa butter, 2.5% or more nonfat cocoa solids, 14% or more total milk solids, 2.5% or more milk fat, and 40% or more total cocoa and milk solids; for white chocolate 20% or more total cocoa solids, 20% or more cocoa butter, 14% or more total milk solids, 3.5% or more milk fat, and 34% or more total cocoa and milk solids.

The following three examples demonstrate the possible changes in chocolate product ingredients that can be used. These recipes can be manipulated to follow or take into consideration any of the above-mentioned, or any other for that matter, standard of identity for a chocolate product or ingredient. There are advantageous properties in at least the reduction of calories and the reduction in costs. Additional advantages include the ability to manipulate viscosity levels and produce desirable microstructures. The percentage listed in the Examples below are approximate and one of skill in the art can vary the percentages and even use additional components of the recipes without departing from the invention.

Example 1

| Recipe 01 | [%] | [kcal] |
| --- | --- | --- |
| chocolate liquor | 23 | 151.0 |
| anhydrous milk fat | 3.4 | 30.5 |
| NFMP | 3.1 | 10.8 |
| Sugar | 20 | 79.9 |
| Lecithin | 0.1 | 0.9 |
| skim milk | 50.4 | 11.2 |
| calories [kcal/100 g] | | 284.4 |
| REDUCTION CAL [%] | | 47 |

Example 2

| Recipe 02 | [%] | [kcal] |
| --- | --- | --- |
| chocolate liquor | 10.75 | 70.6 |
| heavy cream | 8.7 | 34.8 |
| NFMP | 3.23 | 11.3 |
| Sugar | 21.5 | 85.9 |
| lecithin | 0.1 | 0.9 |
| skim milk | 55.72 | 12.4 |
| Calories [kcal/100 g] | | 215.8 |
| REDUCTION CAL [%] | | 60 |

Example 3

| Recipe 03 | [%] | [kcal] |
| --- | --- | --- |
| chocolate liquor | 13 | 85.3 |
| heavy cream | 8.1 | 32.4 |
| NFMP | 6 | 21.0 |
| Sugar | 20 | 79.9 |
| lecithin | 0.1 | 0.9 |
| skim milk | 52.8 | 11.7 |
| calories [kcal/100 g] | | 231.2 |
| REDUCTION CAL [%] | | 57 |

All of the chocolate products from the above three specific examples result in light textured, chocolatey flavored compositions that are generally light and indulgent in flavor. The reduction in calories listed above (Reduction Cal [%]) refers to a comparison with Hershey's Milk Chocolate bars. Products such as these are stable at room temperature and can be frozen and thawed without adversely changing the texture or mouthfeel. In addition, the invention reduces the cost of preparing a standard of identity chocolate product and reduces the total calories of a standard of identity chocolate product.

The chocolate products in FIG. 6 employed a simple method of preparation as noted above. The FIG. 5 sample is conventional semisweet chocolate product of the US market. To prepare the samples for microscopy, an aliquot is hand mixed with a spatula with 10 parts of mineral oil for FIG. 5 and demineralized water in FIG. 6. About ¼ of drop is deposited on a clean glass slide, spread with spatula, and covered with a glass cover slip and pressed for uniform thickness. Images can be viewed with transmitted, polarized compensated light using 16× objectives and the image captured with digital camera. FIG. 6 shows the microstructure of the gelatinized/crystallized oil-in-water suspension of the invention. Microparticles of cocoa bean material and cocoa butter oil droplets can be seen.

Example 4

The following recipes can be used to produce an oil-in-water suspension of the invention without a cocoa product, although cocoa product can be used. The nuts and fruit particles, such as seeds for strawberries, can be part of the insoluble particles in the suspension. As above, the percentages given are approximate and one of skill in the art can vary the percentages and even add additional ingredients without departing from the invention.

| | |
| --- | --- |
| Strawberry puree | 56.8% |
| Sugar | 20% |
| Fractionated palm kernel oil (Cebes 27-75) | 20% |
| Tapioca Starch | 3% |
| Lecithin | 0.2% |
| Banana puree | 51.8% |
| Sugar | 20% |
| Fractionated palm kernel oil (Cebes 27-75) | 20% |
| Guar gum | 1% |
| Lecithin | 0.2% |
| Pecans, grinded | 7% |
| Pear puree | 54.3% |
| Sugar | 20% |
| 17-Sterine | 17% |
| Xanthan | 1.5% |
| Lecithin | 0.2% |
| Macadamia nuts, ground | 7% |

-continued

| | |
|---|---|
| Banana puree | 69.8% |
| Sugar | 20% |
| Cocoa Liquor | 10% |
| Lecithin | 0.2% |
| Strawberries puree | 69.8% |
| Sugar | 20% |
| Cocoa Liquor | 10% |
| Lecithin | 0.2% |

In each case above, the ingredients are mixed in a rotor stator mixer and then heated to about 68° C. The products can be sterilized by longer term heating or ultra high temperature or ultra high temperature and pressure conditions prior to packaging. The fruit pudding examples, such as those above, allow one to produce stable products where the added ingredients, such as crushed nuts, stay in suspension over a period of time, for example 4 months or more.

Example 5

The following recipes refer to a chocolate liquid or hot chocolate embodiments of the invention. As above, the ingredients are listed as approximate percentages and one of skill in the art can vary the percentages and even use additional ingredients without departing from the invention.

| Recipe 1 | |
|---|---|
| Whole liquid milk | 68% |
| ADM 11-N Cocoa Powder | 2% |
| Hershey Special Dark paste | 30% |
| Recipe 2 | |
| Liquid skim milk | 75% |
| ADM 11-N Cocoa Powder | 2% |
| Hershey Special Dark paste | 23% |

For recipes 1 and 2, milk is heated to 40° C. in a kettle, run through a liquefier to mix for 3 minutes, homogenized at 1500 psi and a second stage at 5 psi, and then run through a Micro-Thermics UHT processor at 260° F. for 8 seconds.

| Recipe 3 | |
|---|---|
| Milk (2% milk) | 74% |
| NFMP | 2.5% |
| ADM 11-N cocoa powder | 2.5% |
| Hershey Special Dark paste | 21% |

For recipe 3 above, the ingredients are mixed together with a rotor/stator mixer and cooked in an open pan to about 90° C.

In each case, the resulting suspensions for recipes 1-3 above remain stable at room temperature, have a good chocolatey flavor, and good mouthfeel.

In addition, in any of the above examples or in the invention in general, micronized particles, ingredients, fat droplets, or the like can be used in addition to or as a substitute the a particular ingredient. The micronized components may further define a desired microstructure for a particular product or may provide beneficial stability characteristics to the product. One of skill in the art could select any available micronization technique and/or products for use.

The examples presented above and the contents of the application define and describe examples of the many food ingredients and products that can be produced according to the invention. None of the examples and no part of the description should be taken as a limitation on the scope of the invention as a whole or of the meaning of the following claims.

What is claimed is:

1. A chocolate food product or ingredient having a crystallized and gelatinized structure in an oil-in-water suspension, the food product or ingredient comprising an oil or fat phase consisting essentially of cocoa butter, the cocoa butter at least partially crystallized at room temperature, and further comprising an aqueous phase comprising at least about 10% chocolate liquor or the equivalent in cocoa solids, wherein the soluble polysaccharides and protein present in the cocoa solids are formed into a gelatinized network structure capable of stabilizing the suspension without added hydrocolloids or food starches, and the insoluble particles from at least the cocoa solids are dispersed in the suspension.

2. The food product or ingredient of claim 1, further comprising at least about 5% milk solids.

3. The food product or ingredient of claim 2, having at least about 35% total cocoa solids.

4. The food product or ingredient of claim 3, processed into a chocolate containing product.

5. The food product or ingredient of claim 1, wherein the chocolate liquor is present at about 35% or more.

6. The food product or ingredient of claim 1, wherein the cocoa solids content is supplied as cocoa powder.

7. The food product or ingredient of claim 1, wherein the cocoa butter or cocoa solids content is supplied as a processed chocolate product.

8. The food product or ingredient of claim 1, having at least one emulsifier.

9. The food product or ingredient of claim 8, wherein at least one emulsifier is a lecithin.

10. The food product or ingredient of claim 1, wherein the cocoa butter content is at least about 18%.

11. The food product or ingredient of claim 1, further comprising at least about 12% total milk solids.

12. The food product or ingredient of claim 11 processed into a semisweet chocolate or milk chocolate containing product.

13. The food product or ingredient of claim 11, having at least about 5% nutritive carbohydrate sweetener.

14. The food product or ingredient of claim 1, having at least about 5% nutritive carbohydrate sweetener.

15. The food product or ingredient of claim 14, processed into a reduced or low calorie or sugar free product.

16. The food product or ingredient of claim 1, having at least about 35% total cocoa solids.

17. The food product or ingredient of claim 1, having one or more of an artificial sweetener, xylitol, erythritol, mannitol, sorbitol, lactitol, isomaltulose, or maltitol.

18. The food product or ingredient of claim 1, processed into a chocolate pudding product.

19. The food product or ingredient of claim 1, processed into a cocoa-containing beverage.

20. The food product or ingredient of claim 1, having one or more vitamin or mineral food additives.

21. The food product or ingredient of claim 1, wherein some or all of the chocolate liquor or cocoa solids present have an enhanced or increased level of anti-oxidants or polyphenols.

22. The food product or ingredient of claim 1, further comprising one or more of: concentrated milk, evaporated milk, sweetened condensed milk, dried milk, skim milk, concentrated skim milk, evaporated skim milk, sweetened condensed skim milk, cocoa powder, heavy cream, vanillin, whey protein, anhydrous milk fat, non fat dry milk protein, whole milk powder, soy milk, soy milk protein, lecithin, and sugar.

23. The food ingredient of claim 1, wherein the cocoa butter content is between about 5% and about 10%.

24. The food ingredient of claim 1, wherein the cocoa butter content is above 10%.

25. A method of making a food ingredient comprising:
providing a fat or oil phase comprising cocoa butter and optionally an emulsifier;
providing an aqueous or continuous phase comprising water and a cocoa product to provide final concentration of about 4% in non fat cocoa solids;
mixing the oil or fat phase with the aqueous or continuous phase at a temperature above the melting point of the cocoa butter or optional emulsifier; and
treating or heating the mixed phases under conditions where the protein and starch components of the cocoa solids produce a gelatinized network structure capable of stabilizing the ingredient without added hydrocolloids or food starches.

26. The method of claim 25, wherein the fat or oil phase further comprises an additional fat component with a melting point at about or above 25° C.

27. The method of claim 25, wherein further protein and starch components of the gel network are added through the addition of one or more of: hydrocolloid; polysaccharide; and milk protein; vegetable protein; fruit protein; starch; or polysaccharide.

28. The method of claim 25, wherein an emulsifier is present.

29. The method of claim 25, further comprising adding food grade gas by aerating or whipping.

30. The method of claim 25, wherein one or more vitamin or mineral food additives are present in the aqueous or continuous phase.

31. The method of claim 25, further comprising removing substantially all of the insoluble particles.

32. The method of claim 25, wherein treating or heating the mixed phases comprises heating the mixed phases to about 121° C. for about 8.5 minutes.

33. The method of claim 25, wherein treating or heating the mixed phases comprises heating the mixed phases to about 150° C. for at least about 4 seconds.

34. The method of claim 25, wherein treating or heating the mixed phases comprises heating the mixed phases to about 68° C.

35. The method of claim 25, wherein treating or heating the mixed phases comprises allowing the mixture to rest at room temperature for a period of time sufficient to form a gelatinized network structure.

36. The method of claim 25, wherein mixing the oil or fat phase with the aqueous or continuous phase comprises mixing with a static mixer, a homogenizer, or dynamic mixer.

37. The method of claim 25, wherein the food ingredient is further processed into a product containing dark chocolate, milk chocolate, bittersweet chocolate, semisweet chocolate, or white chocolate.

38. The method of claim 25, further comprising adding one or more of chocolate liquor, cocoa powder, heavy cream, anhydrous milk fat, whey protein concentrates, non-fat milk protein, soy milk, whole milk powder, sugar, lecithin, vanillin, and skim milk to one or both of the fat or oil phase or the aqueous or continuous phase.

39. The method of claim 25, wherein the cocoa butter content is at least about 18% in the final suspension.

40. The method of claim 25, wherein the cocoa butter content is at least about 15% in the final suspension.

41. The method of claim 25, wherein the cocoa butter content is at least about 20% in the final suspension.

42. The method of claim 25, wherein cocoa and milk products are added to produce a final suspension comprising at least about 10% cocoa liquor and about 12% total milk solids.

43. The method of claim 25, wherein cocoa products and milk products are added to produce a final suspension comprising at least about 25% total cocoa solids, including at least about 2.5% fat-free cocoa solids, and further comprising about 12% or more milk solids and about 2.5% or more milk fat.

44. The method of claim 25, further comprising adding milk products to produce a final suspension having at least about 14% milk solids including about 2.5% or more milk fat.

45. The method of claim 25, wherein cocoa products are added to produce a final suspension having at least about 35% total cocoa solids.

46. The method of claim 25, wherein some or all of the cocoa product or cocoa solids present contain an enhanced or increased level of anti-oxidants or polyphenols.

47. A food ingredient produced by the method of any one of claims 25 to 46.

48. A food product comprising a food ingredient produced by the method of any one of claim 25 to 46.

49. A method of producing a cocoa-based oil-in-water suspension comprising:
providing a fat phase comprising cocoa butter;
providing an aqueous phase comprising water, a sugar or sweetener or both, and one or more cocoa products to provide about 4% or more non fat cocoa solids and containing cocoa proteins, cocoa starches, or cell wall materials;
mixing the phases;
heating the mixed phases to form a gelatinized network structure comprised of cocoa proteins and/or cocoa starch components whereby the cocoa protein and/or starch components are capable of stabilizing the suspension without added hydrocolloids or food starches;
wherein the viscosity of the suspension increases after heating.

50. The method of claim 49, wherein skim milk is present in the aqueous phase.

51. The method of claim 49, wherein condensed milk, evaporate milk, whole milk, soy milk, or whole milk powder is present in the aqueous phase.

52. The method of claim 49, wherein the viscosity increase is at least about double the measurable 30 $sec^{-1}$ shear rate.

53. The method of claim 49, wherein mixing results in cocoa butter droplets in the suspension at about room temperature in the range of between 0.5-100 um.

54. The method of claim 49, wherein the mixing results in cocoa butter droplets in the suspension at about room temperature in the range of between 0.5-30 um.

55. The method of claim 49, wherein the mixing results in insoluble cocoa particles in the suspension at about room temperature in the range of between 0.5-100 um.

56. The method of claim 49, wherein the mixing results in insoluble cocoa particles in the suspension at about room temperature in the range of between 0.5-30 um.

57. A food ingredient produced from the method of any one of claims 49-56.

58. A food ingredient produced from the method of any one of claims 49-56, further comprising edible particles about 0.5 mm or greater in diameter.

59. A food ingredient produced from the method of any one of claims 49-56, further comprising one or more of: nuts, ground nuts, crisp edible inclusions, fruit particles, and solid or liquid filling.

60. A chocolate beverage having a structure at least in part comprising a gelatinized oil-in-water suspension, the chocolate beverage comprising an aqueous phase comprising a milk product and about 4% or more non fat cocoa solids and a fat phase comprising cocoa butter, wherein the soluble polysaccharides and protein present in at least the cocoa solids are at least partially formed into a gelatinized network structure and the insoluble particles from at least the cocoa solids are dispersed in suspension, and the gelatinized network structure is capable of stabilizing the suspension without added hydrocolloids or food starches.

61. The chocolate beverage of claim 60, wherein the milk product is selected from whole milk, skim milk, 2% fat milk, or cream.

62. The chocolate beverage of claim 61, further comprising one or more sweeteners.

63. The chocolate beverage of claim 60, wherein cocoa butter droplets present in suspension at about room temperature are in the range of between about 0.5-30 um.

64. A chocolate beverage having a structure at least in part comprising a gelatinized oil-in-water suspension, the chocolate beverage comprising an aqueous phase comprising and about 4% or more non fat cocoa solids and a fat phase comprising cocoa butter, wherein the soluble polysaccharides and protein present in at least the cocoa solids are at least partially formed into a gelatinized network structure and the insoluble particles from at least the cocoa solids are dispersed in suspension, and the gelatinized network structure is capable of stabilizing the suspension without added hydrocolloids or food starches.

65. The chocolate beverage of claim 64, further comprising one or more sweeteners.

66. The chocolate beverage of claim 64, wherein cocoa butter droplets present in suspension at about room temperature are in the range of between about 0.5-30 um.

* * * * *